US010468185B2

United States Patent
Oh et al.

(10) Patent No.: US 10,468,185 B2
(45) Date of Patent: Nov. 5, 2019

(54) MULTILAYER CERAMIC CAPACITOR AND BOARD HAVING THE SAME MOUNTED THEREON

(71) Applicant: SAMSUNG ELECTRO-MECHANICS CO., LTD., Suwon-si, Gyeonggi-do (KR)

(72) Inventors: Beom Seock Oh, Suwon-si (KR); Jin Yung Ryu, Suwon-si (KR); Young Ghyu Ahn, Suwon-si (KR); Jae Yeol Choi, Suwon-si (KR)

(73) Assignee: SAMSUNG ELECTRO-MECHANICS CO., LTD., Suwon-si, Gyeonggi-do (KR)

(*) Notice: Subject to any disclaimer, the term of this patent is extended or adjusted under 35 U.S.C. 154(b) by 15 days.

(21) Appl. No.: 15/832,017

(22) Filed: Dec. 5, 2017

(65) Prior Publication Data

US 2018/0350521 A1    Dec. 6, 2018

(30) Foreign Application Priority Data

Jun. 2, 2017 (KR) .................. 10-2017-0069135
Aug. 9, 2017 (KR) .................. 10-2017-0101132

(51) Int. Cl.
*H01G 4/012* (2006.01)
*H01G 4/30* (2006.01)
(Continued)

(52) U.S. Cl.
CPC ............. *H01G 4/012* (2013.01); *H01G 2/065* (2013.01); *H01G 4/30* (2013.01); *H01G 4/12* (2013.01)

(58) Field of Classification Search
CPC ............. H01G 4/30; H01G 4/012; H01G 4/12
See application file for complete search history.

(56) References Cited

U.S. PATENT DOCUMENTS 7,199,996 B2    4/2007  Togashi et al.
2006/0279903 A1* 12/2006  Togashi ................ H01G 4/232
                                                      361/303
(Continued)

FOREIGN PATENT DOCUMENTS

CN    101471179 A    7/2009
CN    100533615 C    8/2009
(Continued)

OTHER PUBLICATIONS

Office Action issued in corresponding Chinese Application No. 201810161244.6 dated Aug. 30, 2019, with English translation.

*Primary Examiner* — Eric W Thomas
(74) *Attorney, Agent, or Firm* — Morgan, Lewis & Bockius LLP

(57) ABSTRACT

A multilayer ceramic capacitor includes a capacitor body including a plurality of first to third internal electrodes. The first internal electrodes have opposing ends exposed at third and fourth surfaces of the capacitor body. The second internal electrodes have a portion exposed at either of fifth or sixth surfaces of the capacitor body. The third internal electrodes have portions respectively exposed at the fifth and sixth surfaces. First and second external electrodes are on the third and fourth surfaces, respectively, and are connected to the first internal electrodes. Third and fourth external electrodes are on the fifth and sixth surfaces, respectively, and are connected to the second and third internal electrodes.

14 Claims, 13 Drawing Sheets

(51) Int. Cl.
*H01G 2/06* (2006.01)
*H01G 4/12* (2006.01)

(56) References Cited

U.S. PATENT DOCUMENTS

| | | | |
|---|---|---|---|
| 2008/0186652 A1* | 8/2008 | Lee | H01G 4/012 |
| | | | 361/306.3 |
| 2009/0073634 A1* | 3/2009 | Lee | H01G 4/35 |
| | | | 361/303 |
| 2009/0168298 A1 | 7/2009 | Togashi | |
| 2010/0149769 A1* | 6/2010 | Lee | H01G 2/065 |
| | | | 361/768 |
| 2011/0205684 A1* | 8/2011 | Yamamoto | H01G 4/232 |
| | | | 361/305 |
| 2012/0162853 A1 | 6/2012 | Togashi | |
| 2013/0250476 A1* | 9/2013 | Chung | H01G 4/30 |
| | | | 361/303 |
| 2014/0126106 A1* | 5/2014 | Sawada | H01G 4/30 |
| | | | 361/303 |

FOREIGN PATENT DOCUMENTS

| JP | 2012-138415 A | 7/2012 |
|---|---|---|
| JP | 2015-076591 A | 4/2015 |

\* cited by examiner

MULTILAYER CERAMIC CAPACITOR AND BOARD HAVING THE SAME MOUNTED THEREON

CROSS-REFERENCE TO RELATED APPLICATION(S)

This application claims benefit of priority to Korean Patent Application No. 10-2017-0069135 filed on Jun. 2, 2017 and Korean Patent Application No. 10-2017-0101132 filed on Aug. 9, 2017 in the Korean Intellectual Property Office, the disclosure of which are incorporated herein by reference in their entirety.

BACKGROUND

1. Field

The present disclosure relates to a multilayer ceramic capacitor and a board having the same mounted thereon.

2. Description of Related Art

Electronic components that use ceramic material include capacitors, inductors, piezoelectric devices, varistors, thermistors, and the like.

Among such ceramic electronic components, a multilayer ceramic capacitor (MLCC) has positive attributes such as miniaturizability, guaranteed high capacitance, and ease in mounting.

Multilayer ceramic capacitors are chip-type condensers installed on printed circuit boards of various electronic products, for example, image display devices such as liquid crystal displays (LCDs), plasma display panels (PDPs) or the like, computers, personal digital assistants (PDAs), mobile phones, and the like, to charge or discharge electricity.

Such multilayer ceramic capacitors (MLCCs) may be formed by alternately laminating a plurality of dielectric layers and internal electrodes to form a laminate, sintering the laminate, and installing external electrodes. The capacitance may be generally determined by the number of laminated layers of internal electrodes.

On the other hand, a predetermined area is required in order to mount the multilayer ceramic capacitor on the printed circuit board.

When a plurality of multilayer ceramic capacitors having various electrical characteristics are mounted on a single printed circuit board, a predetermined amount of space should be secured, such that respective multilayer ceramic capacitors may operate properly.

With the miniaturization of electronic products, multilayer ceramic capacitors used in such electronic products are also required to be miniaturized and have high capacitance.

However, when an electronic product is slimmed and miniaturized, there may be limited space in which the mount the multilayer ceramic capacitor and it may thus be difficult to design the product.

As the size of an electronic product is miniaturized and the battery size is increased to increase the continuous use time, the size of the printed circuit board and the number and size of passive elements are increasingly restricted.

As a result, the demand for multilayer ceramic capacitors (MLCC) having higher capacitances in products having smaller sizes is increasing.

Manufacturers are developing a highly laminated design by reducing a thickness of each layer while reducing cover and margin thicknesses in order to produce miniaturized and high capacitance products.

As a layer is thinned and the number of laminated layers increases according to ultra high capacitance and miniaturization of a multilayer ceramic capacitor, the number of lead portions for improving electrical characteristics is also increasing.

When the number of lead portions increases, the cumulative step height of the laminate increases, which may thus increase an inverse step at a peripheral portion where there is no lead portion present and thereby adversely affect yield and the product reliability.

In order to increase the capacitance per unit volume, there is a tendency to reduce thicknesses of a cover and margin of a laminate, which may further increase the adverse effect due to a step height difference.

Therefore, there is a demand for a method capable of eliminating various side effects caused by step height differences without deteriorating electrical characteristics.

A technique is disclosed in the related art in which negative printing is performed to fill a portion having no internal electrode with a dielectric material, but this method has a disadvantage in that the process may be complicated and impractical.

SUMMARY

An aspect of the present disclosure is to provide a multilayer ceramic capacitor, in which a step height difference may be reduced without deteriorating electrical characteristics, and a board having the same mounted thereon.

According to an aspect of the present disclosure, a multilayer ceramic capacitor comprises a capacitor body that includes a plurality of first to third internal electrodes alternately stacked, with respective dielectric layers interposed therebetween. The ceramic body has first and second surfaces opposing each other in the stacking direction, third and fourth surfaces opposing each other and connected to the first and second surfaces, and fifth and sixth surfaces opposing each other and connected to the first through fourth surfaces. The first internal electrodes have opposing ends respectively exposed at the third and fourth surfaces. The second internal electrodes have a portion exposed at the fifth or sixth surface. The third internal electrodes have portions respectively exposed at the fifth and sixth surfaces. The multilayer ceramic capacitor also includes first and second external electrodes respectively on the third and fourth surfaces of the capacitor body, and connected to the first internal electrodes. The multilayer ceramic capacitor also includes third and fourth external electrodes respectively on the fifth and sixth surfaces of the capacitor body, and connected to the second and third internal electrodes.

The second internal electrodes may include a first body portion overlapping the first internal electrodes in the stacking direction, and a first lead-out portion extending from the first body portion toward the fifth or sixth surface of the capacitor body.

The third internal electrodes may include a second body portion overlapping the first or second internal electrodes in the stacking direction, and second and third lead-out portions extending from the second body portion toward the fifth and sixth surfaces of the capacitor body, respectively.

The second internal electrodes may be arranged to be alternately exposed at one of the fifth or sixth surfaces of the capacitor body in the stacking direction.

The plurality of second internal electrodes may include one or more second internal electrodes with a portion exposed at the fifth surface of the capacitor body and one or more second internal electrodes with a portion exposed at the sixth surface of the capacitor body.

The first and second external electrodes may each extend from the third and fourth surfaces of the capacitor body to respective portions of the first and second surfaces thereof. The third and fourth external electrodes may each extend from the fifth and sixth surfaces of the capacitor body to respective portions of the first and second surfaces thereof.

The third and fourth external electrodes may each be spaced apart from the third and fourth surfaces of the capacitor body.

The multilayer ceramic capacitor may further include a connection electrode configured to electrically connect the third and fourth external electrodes to each other and be located on at least one of the first or second surfaces of the capacitor body.

According to an aspect of the present disclosure, a board having a multilayer ceramic capacitor mounted thereon, may include a substrate with a plurality of electrode pads on its upper surface and the multilayer ceramic capacitor described above mounted on the substrate, with the plurality of electrode pads respectively connected to corresponding external electrodes.

BRIEF DESCRIPTION OF DRAWINGS

The above and other aspects, features, and advantages of the present disclosure will be more clearly understood from the following detailed description when taken in conjunction with the accompanying drawings, in which.

DETAILED DESCRIPTION

Figure 1:
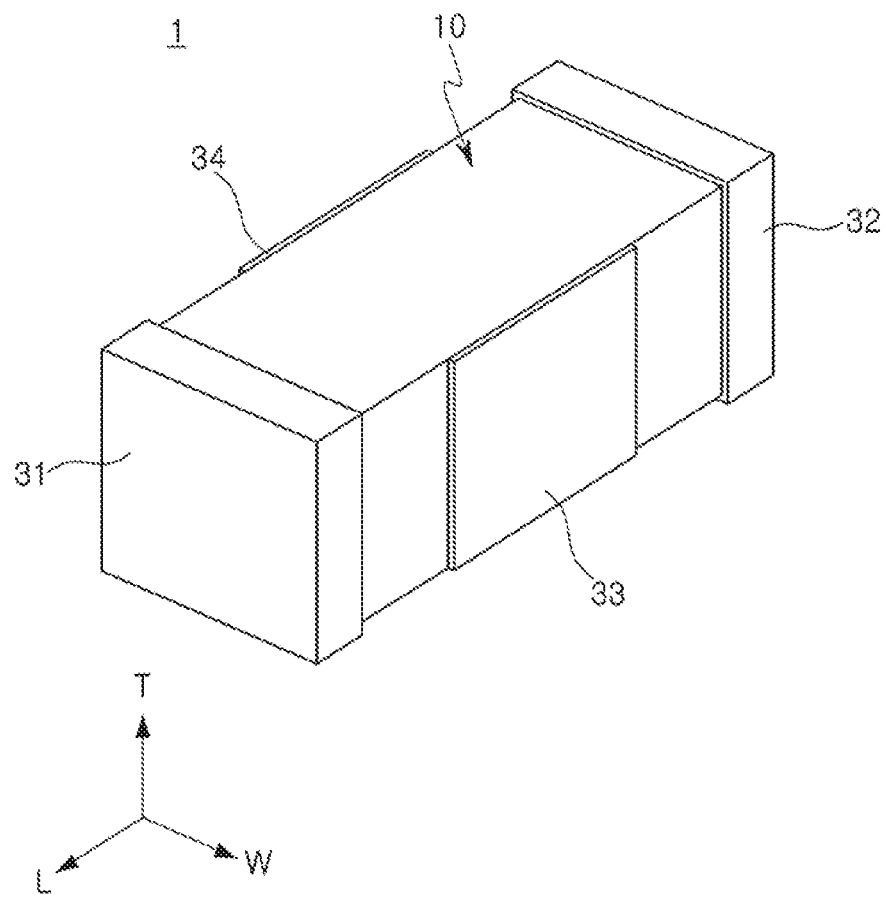
FIG. 1 is a schematic perspective view of a multilayer ceramic capacitor of a comparative example.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be construed as being limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both upward and downward orientations, depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby.

Hereinafter, embodiments of the present disclosure are described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

For example, when the directions of a hexahedron are defined to clearly illustrate exemplary embodiments in the present invention, L, W and T illustrated in the drawings represent a length direction, a width direction, and a thickness direction of a capacitor body, respectively. The thickness direction may be the same direction as a stacking direction in which dielectric layers are stacked.

Figure 2:
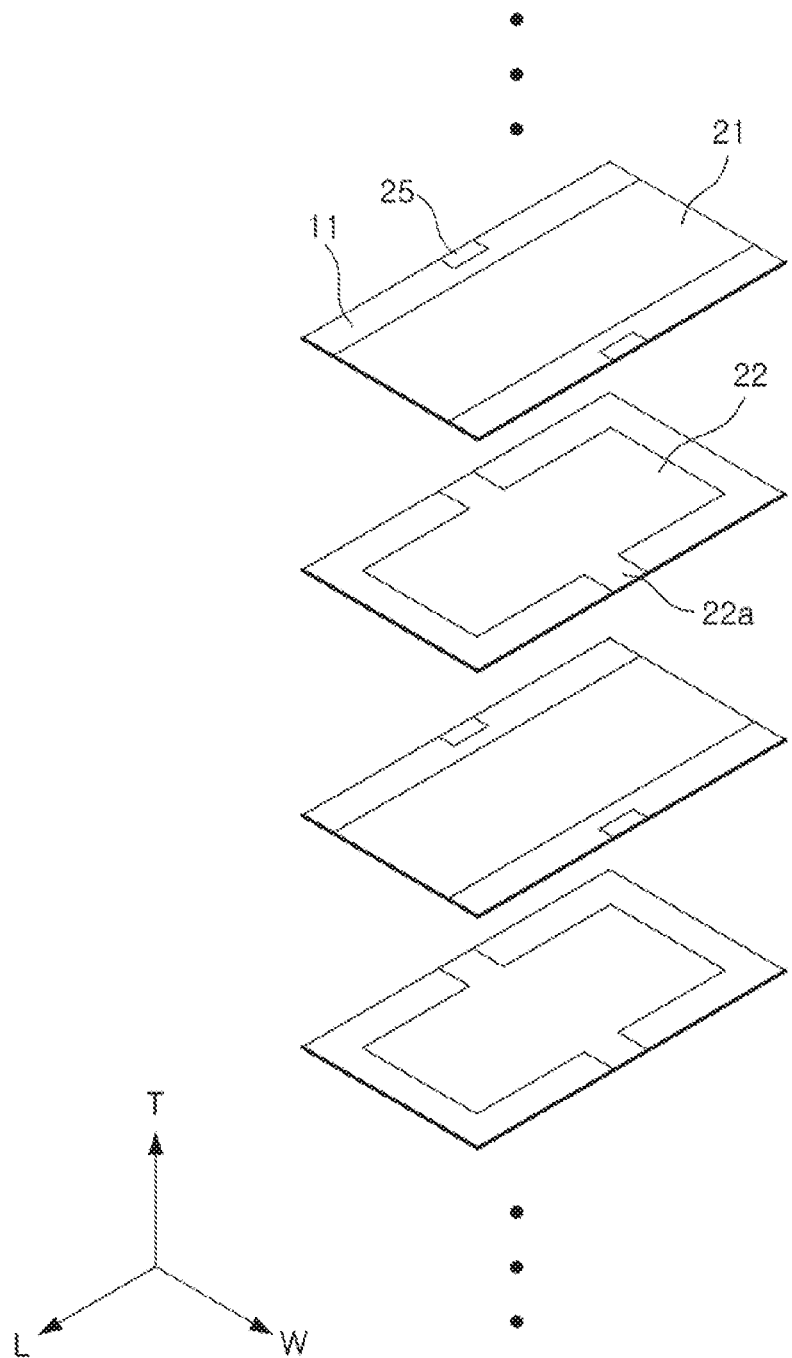
FIG. 2 is an exploded perspective view schematically illustrating an internal electrode structure of FIG. 1.
Figure 3:
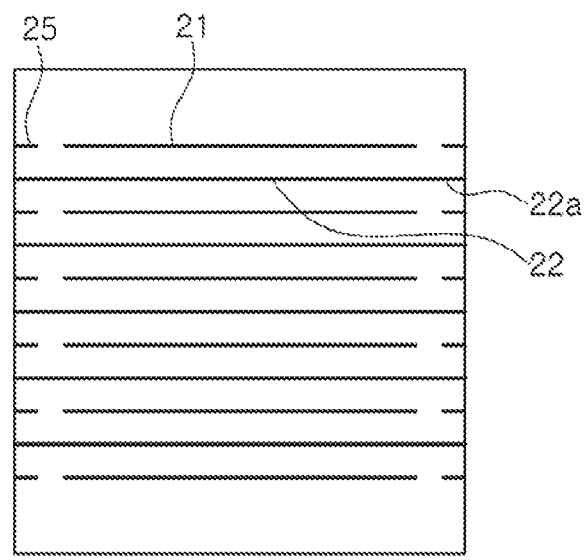
FIG. 3 is a cross-sectional view schematically illustrating a cutaway surface of a central portion of the capacitor body of FIG. 1, taken in a width-thickness direction.
Figure 3:
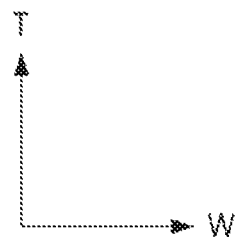

FIG. 1 is a schematic perspective view of a multilayer ceramic capacitor of a comparative example. FIG. 2 is an exploded perspective view schematically illustrating an internal electrode structure of FIG. 1. FIG. 3 is a cross-sectional view schematically illustrating a cutaway surface of a central portion of the capacitor body of FIG. 1, taken in a width-thickness direction.

Referring to FIGS. 1 to 3, a multilayer ceramic capacitor 1 of the comparative example includes a capacitor body 10 in which a plurality of dielectric layers 11 are laminated, and first to fourth external electrodes 31 to 34 disposed on outer surfaces of the capacitor body 10.

The capacitor body 10 includes a first internal electrode 21 and a second internal electrode 22 alternately disposed to face each other in a T direction, with a respective dielectric layer 11 interposed therebetween.

Opposing ends of the first internal electrode 21 are exposed at respective end surfaces of the capacitor body 10 in an L direction, and the second internal electrode 22 is exposed at opposing sides of the capacitor body 10 in a W direction through lead-out portions 22a thereof.

In this case, the first internal electrode 21 may be a signal portion, and the second internal electrode 22 may be a ground (GND) portion.

When the first internal electrode 21 and the second internal electrode 22 are formed on a larger dielectric layer prior to being cut into the dielectric layers shown, the larger dielectric layer may be cut such that a portion of the lead-out portion 22a of the second internal electrode 22 is partially left on the dielectric layer of the first internal electrode 21 and forms a dummy pattern 25. The dummy pattern 25 may be disposed on a position of the same layer in the same position as the first internal electrode 21, corresponding to a position of the lead-out portion 22a.

Due to the lead-out portions 22a and the dummy patterns 25 disposed on margins of the capacitor body 10 in the width direction, a step between the lead-out portion 22a and a peripheral portion in which the dummy pattern 25 is not formed, and between the lead-out portion 22a and a portion in which the dummy pattern 25 is formed, maybe significantly increased, and thus, an extreme imbalance may occur. As a result, a fine gap may be formed in the vicinity of the lead-out portion 22a, and upper and lower portions of the lead-out portion 22a may have a structure vulnerable to cracks. Thus, a method in which such an increase in the step height may be prevented is required.

Figure 4:
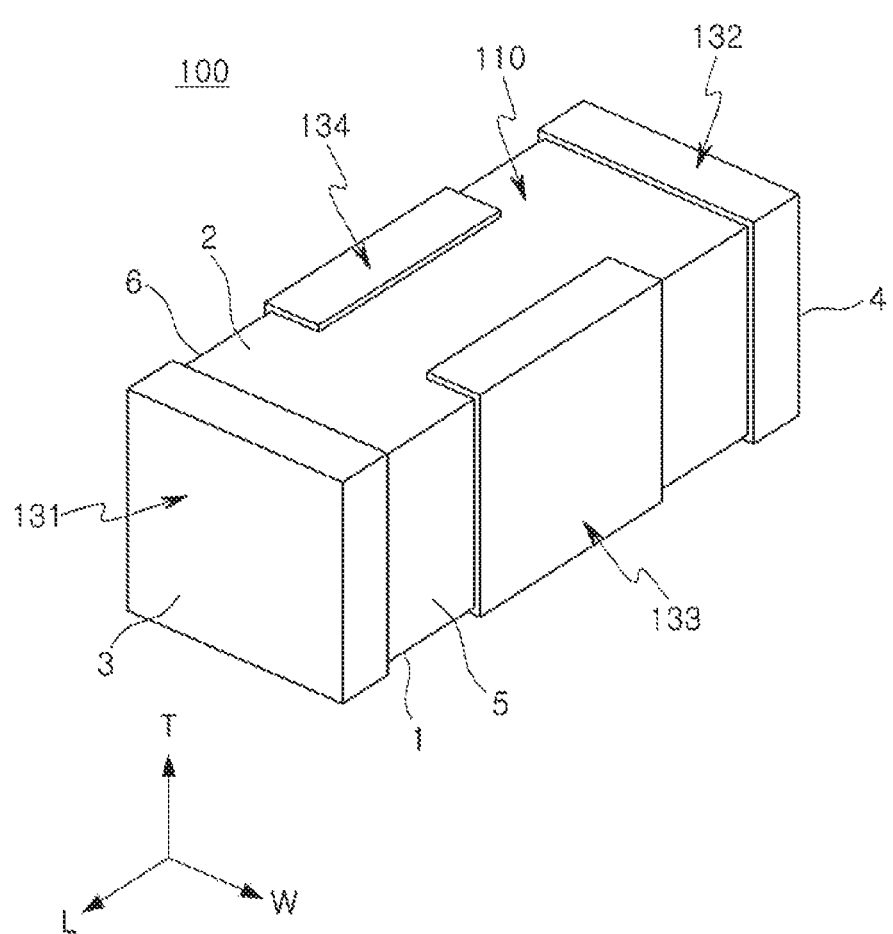
FIG. 4 is a perspective view schematically illustrating a multilayer ceramic capacitor according to an exemplary embodiment in the present disclosure.
Figure 5:
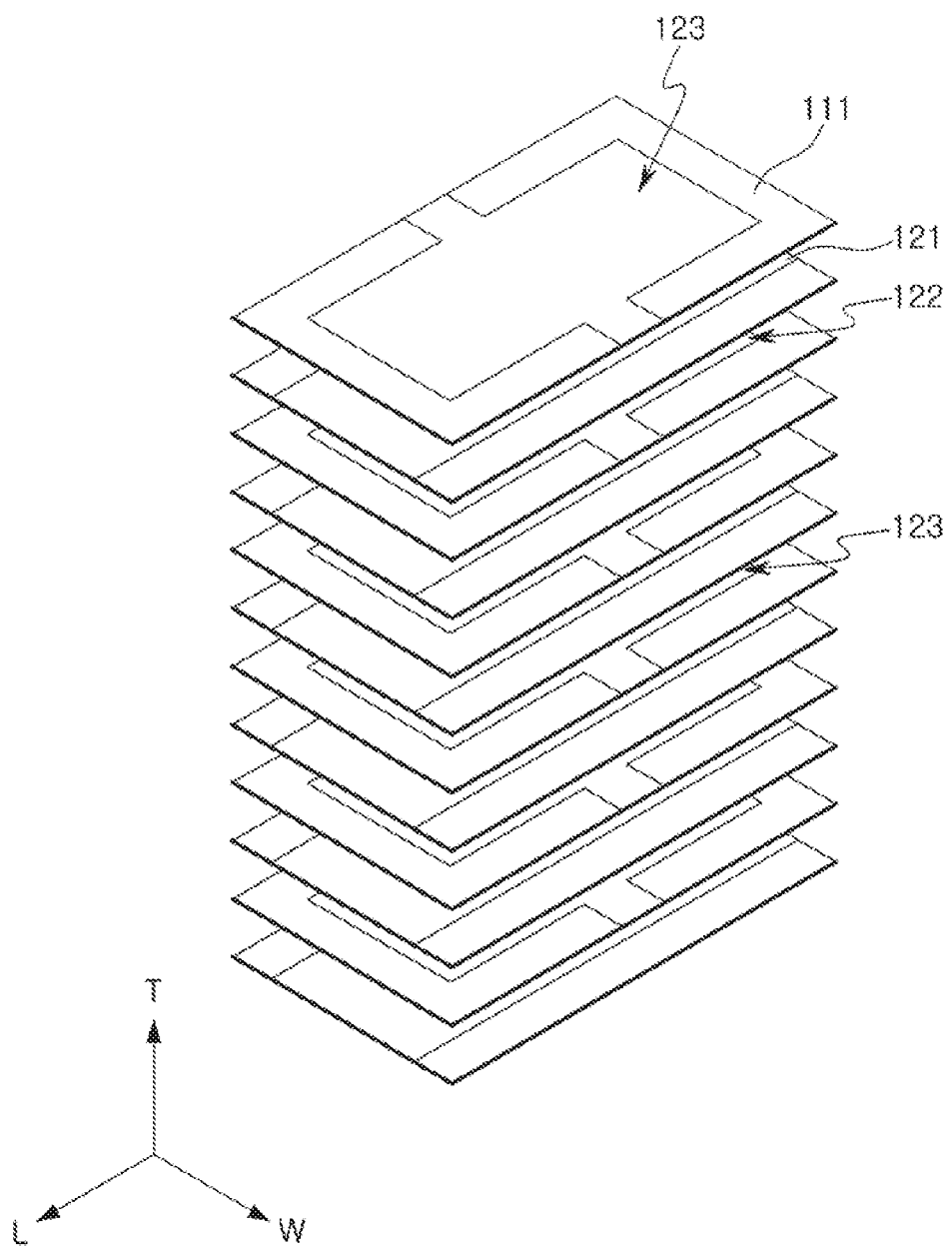
FIG. 5 is an exploded perspective view schematically illustrating an internal electrode structure of FIG. 4.
Figure 6:
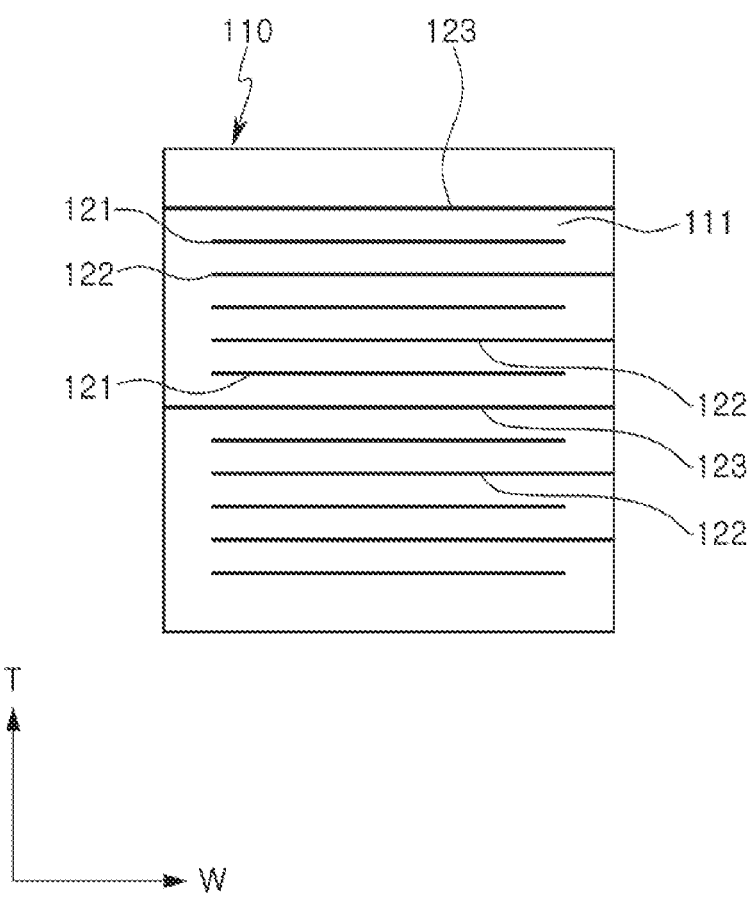
FIG. 6 is a cross-sectional view schematically illustrating a cutaway surface of a central portion of a capacitor body of FIG. 4, taken in a width-thickness direction.
Figure 7A:
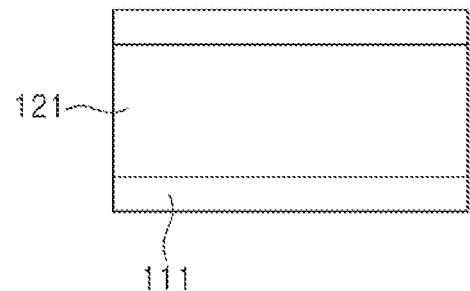
FIGS. 7A to 7C are plan views schematically illustrating internal electrodes of a multilayer ceramic capacitor according to an exemplary embodiment in the present disclosure.
Figure 7B:
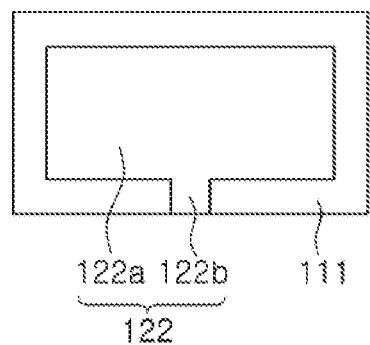
Figure 7C:
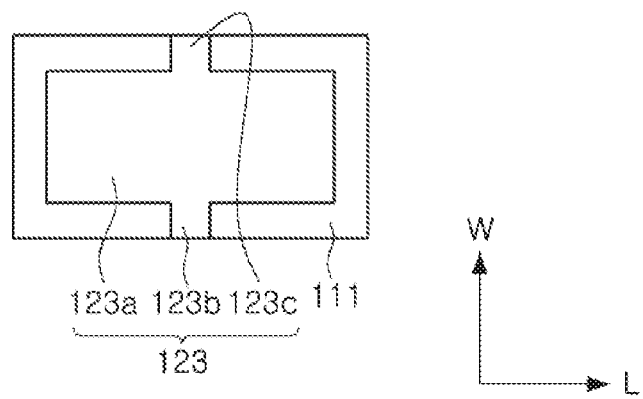

FIG. 4 is a perspective cross-sectional view schematically illustrating a multilayer ceramic capacitor according to an exemplary embodiment. FIG. 5 is an exploded perspective view schematically illustrating an internal electrode structure of FIG. 4. FIG. 6 is a cross-sectional view schematically illustrating a cutaway surface of a central portion of a capacitor body of FIG. 4, taken in a width-thickness direction. FIGS. 7A to 7C are plan views schematically illustrating internal electrodes of a multilayer ceramic capacitor according to an exemplary embodiment.

With reference to FIGS. 4 to 7, a multilayer ceramic capacitor according to an exemplary embodiment will be described.

A multilayer ceramic capacitor 100 according to an exemplary embodiment may include a capacitor body 110, first to third internal electrodes 121 to 123, and first to fourth external electrodes 131 to 134.

The capacitor body 110 may include a plurality of dielectric layers 111. The shape of the capacitor body 110 is not particularly limited, but may generally have a hexahedral shape as illustrated in FIG. 4.

The capacitor body 110 may include first and second surfaces 1 and 2 opposing each other in the thickness (T) direction, third and fourth surfaces 3 and 4 connected to the first and second surfaces 1 and 2 and opposing each other in the length (L) direction, and fifth and sixth surfaces 5 and 6 connected to the first and second surfaces 1 and 2 and connected to the third and fourth surfaces 3 and 4, and opposing each other in the width (W) direction.

The dielectric layers 111 may be in a sintered state, and may be integrated such that it may be difficult to confirm boundaries between adjacent dielectric layers 111 without using a scanning electron microscope (SEM).

The dielectric layer 111 may include a ceramic powder, an organic solvent, and an organic binder.

The ceramic powder may be a material having a high dielectric constant. The ceramic powder may be a barium titanate ($BaTiO_3$)-based material, a strontium titanate ($SrTiO_3$)-based material, or the like, but is not limited thereto.

A plurality of internal electrodes may be disposed in the capacitor body 110 in such a manner that the plurality of internal electrodes are separated from each other respective dielectric layers 111 interposed therebetween.

In the exemplary embodiment, a plurality of first and second internal electrodes 121 and 122 may be alternately stacked in the thickness direction with the dielectric layer 111 interposed therebetween. In such a case, the thickness direction is also the stacking direction.

Opposing ends of the first internal electrodes 121 may be exposed at the third and fourth surfaces 3 and 4 of the capacitor body 110, respectively.

The second internal electrodes 122 may have a portion exposed at one of the fifth or sixth surfaces 5 and 6 of the capacitor body 110. Although the exemplary embodiment illustrates that the second internal electrode 122 is exposed at the fifth surface 5 of the capacitor body 110, the present disclosure is not limited thereto.

The second internal electrodes 122 may comprise a first body portion 122a overlapping at least a portion of the first internal electrodes 121 in the stacking direction and a first lead-out portion 122b extending from the first body portion 122a toward the fifth surface 5 to be exposed at the fifth surface.

In the exemplary embodiment, the first lead-out portion 122b may only be exposed at one side of the capacitor body 110 in the width direction. Since the first lead-out portion 122b of the second internal electrode 122 is only exposed at one side of the capacitor body 110 as described above, the step height thereof with respect to a peripheral portion thereof in which the lead-out portion is not formed may be reduced.

The third internal electrodes 123 may have portions respectively exposed at the fifth and sixth surfaces 5 and 6 of the capacitor body 110.

The third internal electrodes 123 may be disposed between predetermined sections in which the first and second internal electrodes 121 and 122 are stacked, and the number of the first and second internal electrodes disposed between the sections is not limited to a specific number. However, if the number of the third internal electrodes 123 is excessively increased, the effect of reducing a step height difference may be reduced.

The third internal electrodes 123 may include a second body portion 123a, overlapping at least a portion of the first internal electrodes 121 or the first body portion 122a of the second internal electrodes 122 in the thickness direction, and second and third lead-out portions 123b and 123c extending from the second body portion 123a toward the fifth and sixth surfaces 5 and 6 of the capacitor body 110 to be exposed at the fifth and sixth surfaces 5 and 6, respectively.

If an internal electrode simultaneously connecting the third and fourth external electrodes 133 and 134 to each other is not present in the multilayer ceramic capacitor 100 at all, there maybe a problem where the capacitance is reduced to about half of that of the comparative example. In detail, since a ground GND is connected by a circuit in an application, there may not be a problem, but a problem may occur in a selection process.

The third internal electrode 123 of the exemplary embodiment may prevent such a problem. For example, by including the third internal electrode, a reduction in capacitance in the selection process may be prevented, and a decrease in capacitance of the multilayer ceramic capacitor 100 may be prevented.

The first to third internal electrodes 121, 122 and 123 may be formed using a conductive paste including a conductive metal.

Examples of the conductive metal may include nickel (Ni), copper (Cu), palladium (Pd), or alloys thereof, but a material thereof is not limited thereto.

The multilayer ceramic capacitor 100 according to the exemplary embodiment may include the first to fourth external electrodes 131 to 134 formed on outer surfaces of the capacitor body 110 and selectively connected to and electrically connected to internal electrodes.

The first and second external electrodes 131 and 132 may be disposed on the third and fourth faces 3 and 4 of the capacitor body 110, respectively. The ends of the first internal electrode 121 may be respectively connected to the first and second external electrodes 131 and 132 to be electrically connected.

The first and second external electrodes 131 and 132 may extend to respective portions of the first and second surfaces 1 and 2 of the capacitor body 110. The first and second external electrodes 131 and 132 may also extend to respective portions of the fifth and sixth surfaces 5 and 6 of the capacitor body 110.

The third and fourth external electrodes 133 and 134 may be disposed on the fifth and sixth surfaces 5 and 6 of the capacitor body 110. The first lead-out portion 122b of the second internal electrode 122 and the second lead-out portion 123b of the third internal electrode 123 may be connected to the third external electrode 133 to be electrically connected thereto. The third lead-out portion 123c of the third internal electrode 123 may be connected to the fourth external electrode 134 to be electrically connected thereto.

The third and fourth external electrodes 133 and 134 may extend to portions of the first and second surfaces 1 and 2 of the capacitor body 110.

The third and fourth external electrodes 133 and 134 may be spaced apart from the third and fourth surfaces 3 and 4 of the capacitor body 110 by a predetermined distance.

The first to fourth external electrodes 131 to 134 may be formed using a conductive paste including a conductive metal.

The conductive metal may be nickel (Ni), copper (Cu), tin (Sn), or alloys thereof, but is not limited thereto.

The conductive paste may further include an insulating material, which may be, for example, glass, but is not limited thereto.

The method of forming the first to fourth external electrodes 131 to 134 is not particularly limited. For example, the first to fourth external electrodes 131 to 134 maybe formed by dipping the capacitor body 110, and may also be formed using other methods such as sputtering, plating, or the like.

A plating layer may be formed on the first to fourth external electrodes 131 to 134. The plating layer may include a nickel plating layer formed on the external electrodes and a tin plating layer formed on the nickel plating layer.

For the multilayer ceramic capacitor configured as described above according to the exemplary embodiment, since the first lead-out portion 122b of the second internal electrodes 122 is only disposed on one side of the second internal electrode 122 in the width direction, a problem of a step height difference caused by the lead-out portion may be solved. Simultaneously therewith, the third internal electrode 123 is formed to connect the third and fourth external electrodes 133 and 134 to each other, thereby improving electrical connectivity and preventing the occurrence of a problem caused in a selection process.

Since the number of lead-out portions of the internal electrodes the width direction is reduced, damage to a cover region of the capacitor body may be reduced, and a minute gap and cracks that may occur due to a step height difference in a periphery of the lead-out portion may also be reduced.

Although the exemplary embodiment illustrates the multilayer ceramic capacitor 100 as a four-terminal capacitor including four external electrodes, the present disclosure is not limited thereto. The multilayer ceramic capacitor may include a relatively larger number of external electrodes.

Figure 8:
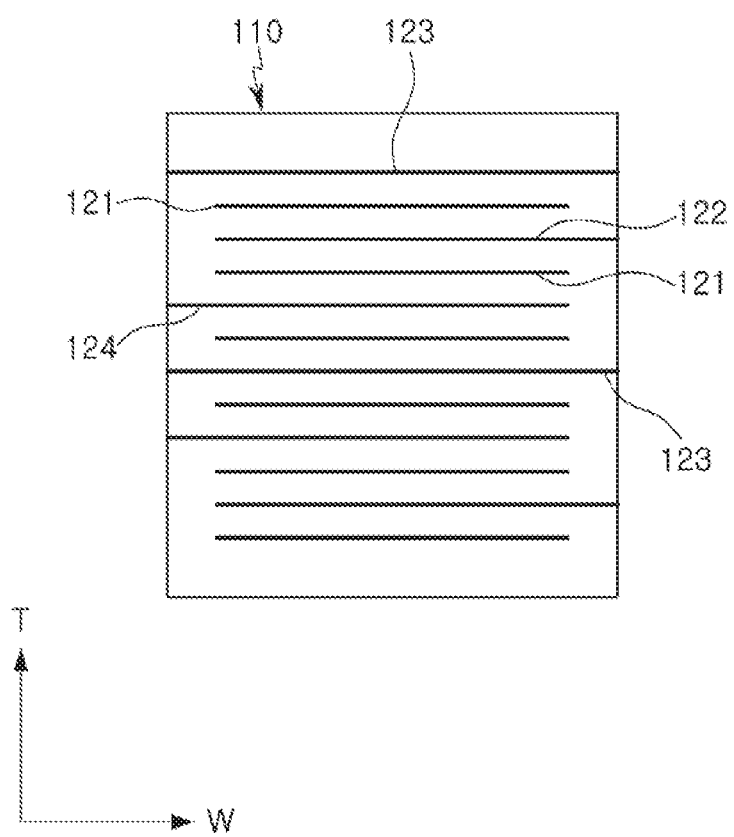
FIG. 8 is a cross-sectional view illustrating a cutaway surface of a central portion of a capacitor body of a multilayer ceramic capacitor according to another exemplary embodiment in the present disclosure, taken in a width-thickness direction.
Figure 9A:
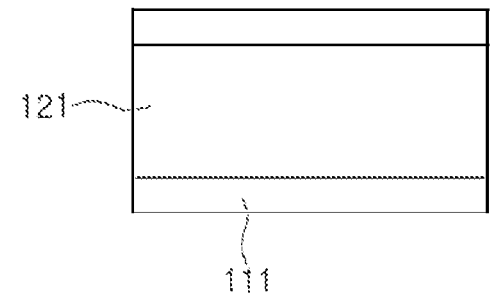
FIGS. 9A to 9D are plan views schematically illustrating internal electrodes of a multilayer ceramic capacitor according to an exemplary embodiment in the present disclosure.
Figure 9B:
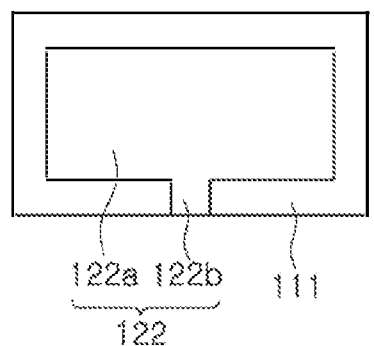
Figure 9C:
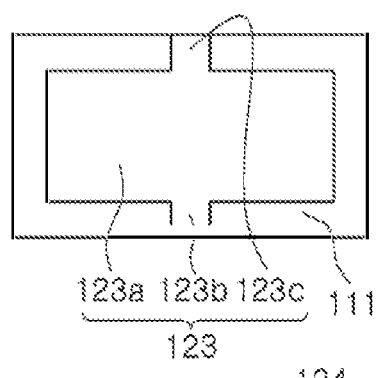
Figure 9D:
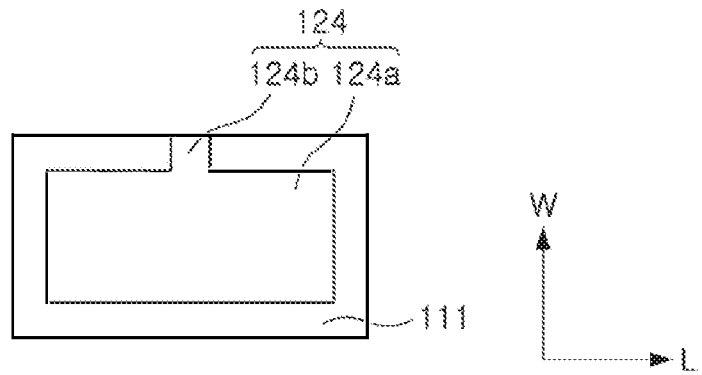

FIG. 8 is a cross-sectional view illustrating a cutaway surface of a central portion of a capacitor body of a multilayer ceramic capacitor according to another exemplary embodiment, in a width-thickness direction. FIGS. 9A to 9D are plan views schematically illustrating internal electrodes of the multilayer ceramic capacitor according to the exemplary embodiment.

Referring to FIGS. 8 and 9A to 9D, a multilayer ceramic capacitor according to another exemplary embodiment may further include fourth internal electrodes 124.

The fourth internal electrodes 124 may have a structure similar to that of a second internal electrodes 122, and may include a third body portion 124a overlapping a first body portion 122a in a T direction, and a fourth lead-out portion 124b extending from the third body portion 124a to be exposed at the sixth surface 6 of a capacitor body 110 and formed to oppose the first lead-out portion 122b in a width direction. That is, the fourth internal electrode 124 is a second internal electrode 122 exposed at the opposing surface of the capacitor body.

The second internal electrode 122 and the fourth internal electrode 124 are arranged in such a manner that their respective lead-out portions are alternately arranged on two sides of the internal electrodes in the width direction to be respectively exposed only to one side of the capacitor body. Therefore, the total number of lead-out portions exposed to one side of the capacitor body 110 may be reduced, compared to a multilayer ceramic capacitor according to the comparative example.

For example, as the first lead-out portion 122b of the second internal electrode 122 and the fourth lead-out portion 124b of the fourth internal electrode 124 are respectively exposed only to one side of the capacitor body 110, the step height difference with respect to the peripheral portion thereof where the first and fourth lead-out portions 122b and 124b are not formed may be reduced.

The first and fourth lead-out portions 122b and 124b of the second and fourth internal electrodes 122 and 124 may be laminated such that the positions of the first and fourth lead-out portions 122b and 124b alternate.

In the following discussion, an overlapping description is omitted.

Figure 10:
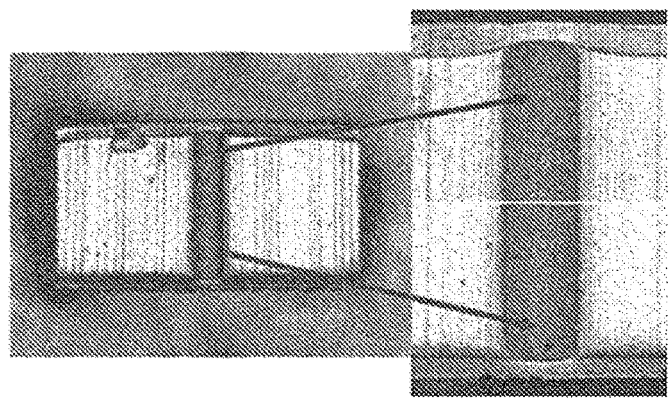
FIG. 10 is an image of an exposed portion of an internal electrode of the multilayer ceramic capacitor according to the exemplary embodiment of FIG. 8.

FIG. 10 is an image obtained by imaging an exposed portion of an internal electrode of a multilayer ceramic capacitor according to the exemplary embodiment of FIG. 8.

FIG. 10 shows that when the number of lead-out portions exposed to one side is reduced to half of that of the multilayer ceramic capacitor according to the comparative example of FIG. 1, there is little or no step height difference due to lead-out portions.

Figure 11:
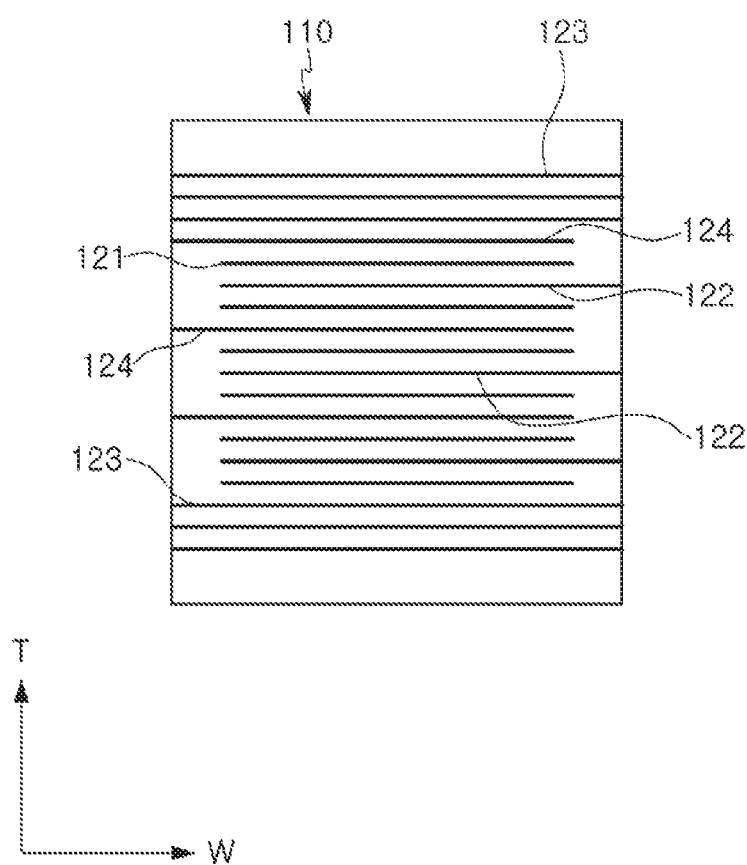
FIG. 11 is a cross-sectional view schematically illustrating a cutaway surface of a central portion of a multilayer ceramic capacitor according to another exemplary embodiment in the present disclosure, taken in a width-thickness direction.

FIG. 11 is a cross-sectional view schematically illustrating a cut-away surface of a central portion of a capacitor body of a multilayer ceramic capacitor according to another exemplary embodiment, in a width-thickness direction.

Referring to FIG. 11, third internal electrodes 123 may be disposed in upper and lower cover regions of a capacitor body 110. That is, the third internal electrodes 123 may be used as the uppermost and lowermost internal electrodes in the capacitor body 110.

In another exemplary embodiment, third internal electrodes 123 maybe disposed in a central portion and in upper and lower cover layers of a capacitor body 110.

The number of laminated layers of the third internal electrodes 123 may be one layer or several successive layers that overlap each other, according to chip characteristics. Although the exemplary embodiment illustrates three third internal electrodes overlapping each other for each of the upper and lower cover regions, the present disclosure is not limited thereto.

In the following discussion, an overlapping description is omitted.

Figure 12:
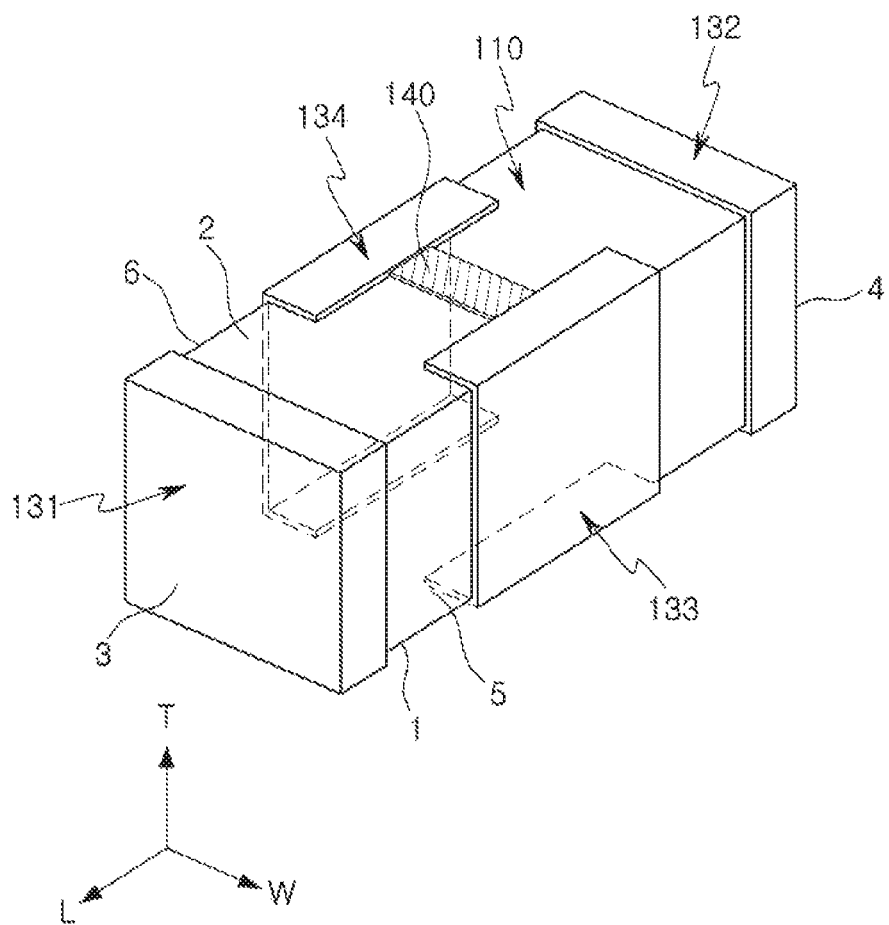
FIG. 12 is a perspective view illustrating a connection electrode added to FIG. 4.

FIG. 12 is a perspective view illustrating a connection electrode added to FIG. 4.

In order to solve a problem that may occur in sorting as described above, a connection electrode 140 electrically connecting third and four external electrodes 133 and 134 to each other may further be disposed on a first surface 1 or a second surface 2 of the capacitor body 110, as illustrated in FIG. 12.

Although FIG. 12 illustrates the connection electrode 140 as being formed on the second surface 2 of the capacitor body 110 to connect the third and fourth external electrodes 133 and 134 to each other, the connection electrode 140 may be formed only on the first surface 1 of the capacitor body 110 or may be formed on both the first and second surfaces 1 and 2 of the capacitor body 110.

The exemplary embodiment illustrates the connection electrode 140 with a rectangular shape, but the present disclosure is not limited thereto. The connection electrode 140 may be formed to have a curved shape, a zigzag shape, or the like.

A dielectric layer (not shown) may further be disposed on the connection electrode 140 to cover the connection electrode 140, such that the connection electrode 140 may be prevented from being externally exposed.

The material of the connection electrode 140 is not particularly limited, and the connection electrode 140 may be formed using a conductive paste including a conductive metal, for example, similar to the first to fourth internal electrodes 121 to 124.

The conductive metal may be nickel (Ni), copper (Cu), palladium (Pd), or alloys thereof, but is not limited thereto.

In the following discussion, an overlapping description is omitted.

Figure 13:
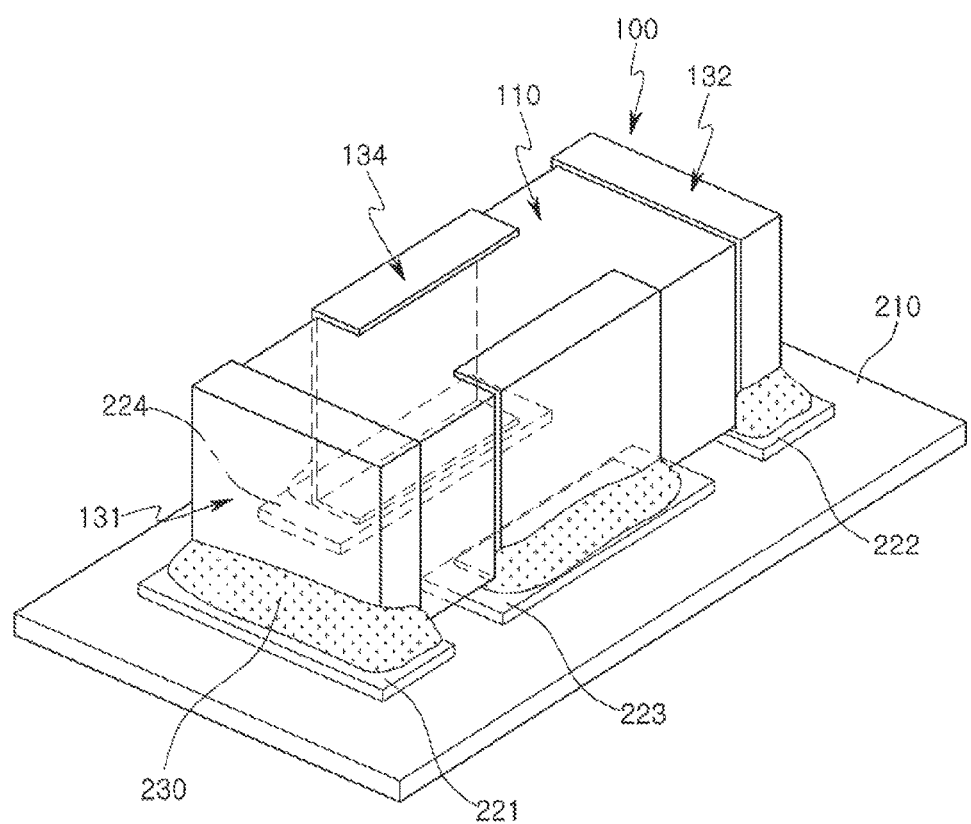
FIG. 13 is a perspective view illustrating the multilayer ceramic capacitor of FIG. 4 mounted on a board.

FIG. 13 is a perspective view illustrating the multilayer ceramic capacitor of FIG. 4 mounted on a board.

FIG. 13 illustrates a multilayer ceramic capacitor according to an exemplary embodiment mounted on a board. The board may include a substrate 210 on which first to fourth electrode pads 221 to 224 are provided. A multilayer ceramic capacitor 100 may be mounted so that its first to fourth external electrodes 131 to 134 are respectively connected to the first to fourth electrode pads 221 to 224. In FIG. 13, reference numeral 230 denotes solder for bonding an electrode pad to an external electrode.

As set forth above, in a multilayer ceramic capacitor according to an exemplary embodiment, the number of lead-out portions of internal electrodes, exposed in a width direction of a capacitor body, may be reduced, while maintaining electrical connectivity of external electrodes disposed on surfaces of the capacitor body in the width direction. Accordingly, a step height difference in peripheral portions of the capacitor body, due to exposure of internal electrodes, may be reduced while maintaining the same characteristics.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
a capacitor body including a plurality of first to third internal electrodes alternately stacked, with respective dielectric layers interposed therebetween, and having a first surface and a second surface opposing each other in a stacking direction, a third surface and a fourth surface connected to the first surface and the second surface and opposing each other, and a fifth surface and a sixth surface connected to the first surface and the second surface, connected to the third surface and the fourth surface, and opposing each other, wherein the first internal electrodes have opposing ends respectively exposed at the third and fourth surfaces, the second internal electrodes have a portion exposed at the fifth or sixth surface, and the third internal electrodes have portions respectively exposed at the fifth and sixth surfaces;
a first external electrode and a second external electrode respectively on the third surface and the fourth surface of the capacitor body, and connected to the first internal electrodes; and
a third external electrode and a fourth external electrode respectively on the fifth surface and the sixth surface of the capacitor body, and connected to the second internal electrodes and the third internal electrodes.

2. The multilayer ceramic capacitor of claim 1, wherein the second internal electrodes include a first body portion overlapping the first internal electrodes in the stacking direction, and a first lead-out portion extending from the first body portion toward the fifth or sixth surface of the capacitor body.

3. The multilayer ceramic capacitor of claim 1, wherein the third internal electrodes include a second body portion overlapping the first or second internal electrodes in the stacking direction, and second and third lead-out portions extending from the second body portion toward the fifth and sixth surfaces of the capacitor body, respectively.

4. The multilayer ceramic capacitor of claim 1, wherein the second internal electrodes are arranged to be alternately exposed at one of the fifth or sixth surfaces of the capacitor body in the stacking direction.

5. The multilayer ceramic capacitor of claim 4, wherein the plurality of second internal electrodes include one or more second internal electrodes with a portion exposed at the fifth surface of the capacitor body and one or more second internal electrodes with a portion exposed at the sixth surfaces of the capacitor body.

6. The multilayer ceramic capacitor of claim 1, wherein the first and second external electrodes each extend from the third and fourth surfaces of the capacitor body to respective portions of the first and second surfaces thereof, and the third and fourth external electrodes each extend from the fifth and sixth surfaces of the capacitor body to respective portions of the first and second surfaces thereof.

7. The multilayer ceramic capacitor of claim 1, wherein the third and fourth external electrodes are each spaced apart from the third and fourth surfaces of the capacitor body.

8. The multilayer ceramic capacitor of claim 1, further comprising a connection electrode configured to electrically connect the third and fourth external electrodes to each other and located on at least one of the first surface and the second surface of the capacitor body.

9. A board having a multilayer ceramic capacitor mounted thereon, the board comprising:
a substrate, with a plurality of electrode pads on an upper surface of the substrate; and
the multilayer ceramic capacitor according to claim 1, mounted on the substrate, with the plurality of electrode pads respectively connected to corresponding external electrodes.

10. A multilayer ceramic capacitor, comprising:
a capacitor body, including a plurality of first, second, and third internal electrodes, and with first and second surfaces opposing each other in a stacking direction, third and fourth surfaces opposing each other in a length direction perpendicular to the stacking direction, and fifth and sixth surfaces opposing each other in a width direction perpendicular to the stacking and length directions, wherein the plurality of first internal electrodes are spaced apart from the fifth and sixth surfaces of the capacitor body,
wherein the plurality of second internal electrodes are spaced apart from the third and fourth surfaces of the capacitor body, and are spaced apart from at least one of the fifth or sixth surface of the capacitor body,
wherein the plurality of third internal electrodes are spaced apart from the third and fourth surfaces of the capacitor body,
wherein uppermost electrodes in the capacitor body in the stacking direction consist of one or more third internal electrodes, and
wherein, below the uppermost electrodes in the capacitor body, second internal electrodes are alternately stacked with first internal electrodes, and the second internal electrodes alternate, along the stacking direction, between second internal electrodes spaced apart from the fifth surface of the capacitor body and second internal electrodes spaced apart from the sixth surface of the capacitor body.

11. The multilayer ceramic capacitor of claim 10, further comprising:
first and second external electrodes respectively on the third and fourth surfaces of the capacitor body and electrically connected to the plurality of first internal electrodes; and
third and fourth external electrodes respectively on the fifth and sixth surfaces of the capacitor body and electrically connected to the plurality of third internal electrodes,
wherein one or both of the third and fourth external electrodes are electrically connected to the plurality of second internal electrodes.

12. The multilayer ceramic capacitor of claim 10, wherein the plurality of second internal electrodes are all spaced apart from the sixth surface of the capacitor body.

13. The multilayer ceramic capacitor of claim 10,
wherein one or more of the plurality of second internal, electrodes are spaced apart from the fifth surface of the capacitor body, and
wherein one or more of the plurality of second internal electrodes are spaced apart from the sixth surface of the capacitor body.

14. The multilayer ceramic capacitor of claim 10,
wherein lowermost electrodes in the capacitor body in the stacking direction consist of one or more third internal electrodes, and the alternately stacked first and second internal electrodes are between the uppermost and lowermost electrodes.

* * * * *